(12) United States Patent
Furuya et al.

(10) Patent No.: US 11,002,950 B2
(45) Date of Patent: May 11, 2021

(54) MICROSCOPE OBJECTIVE

(71) Applicant: OLYMPUS CORPORATION, Hachioji (JP)

(72) Inventors: Yo Furuya, Kamiina (JP); Keisuke Ichikawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 449 days.

(21) Appl. No.: 15/377,529

(22) Filed: Dec. 13, 2016

(65) Prior Publication Data

US 2017/0168281 A1 Jun. 15, 2017

(30) Foreign Application Priority Data

Dec. 15, 2015 (JP) .............................. JP2015-244628

(51) Int. Cl.
*G02B 21/02* (2006.01)
(52) U.S. Cl.
CPC .................................. *G02B 21/02* (2013.01)
(58) Field of Classification Search
CPC ........ G02B 21/02; G02B 21/33; G02B 21/16; G02B 21/025; G02B 21/06; G02B 9/64; G02B 13/18; G02B 13/0045; G02B 13/006; G02B 9/14; G02B 15/1421; G02B 15/145117; G02B 15/17; H04N 5/23296; G01N 21/6458

USPC ........... 359/656, 368, 754, 689, 690; 348/79
See application file for complete search history.

(56) References Cited

U.S. PATENT DOCUMENTS

| 4,232,941 A | 11/1980 | Tojo et al. |
| 2003/0165021 A1* | 9/2003 | Kawasaki ............ G02B 21/025 359/690 |
| 2008/0212199 A1 | 9/2008 | Yonetani |
| 2012/0113524 A1* | 5/2012 | Kasahara ............... G02B 21/33 359/656 |

FOREIGN PATENT DOCUMENTS

| JP | 54036746 A | 3/1979 |
| JP | 61275810 A | 12/1986 |
| JP | 09197283 A | 7/1997 |
| JP | 2007133071 A | 5/2007 |
| JP | 2008185965 A | 8/2008 |
| JP | 2010014856 A | 1/2010 |
| JP | 2010224477 A | 10/2010 |

* cited by examiner

Primary Examiner — James C. Jones
(74) Attorney, Agent, or Firm — Holtz, Holtz & Volek PC

(57) ABSTRACT

A microscope objective includes three groups that are in a positive-negative-positive configuration. The first lens group includes a plurality of cemented lenses, and includes, closest to the object, a meniscus lens having its concave surface on the object side. The second lens group includes a first meniscus lens component having its concave surface on the image side and a second meniscus lens component having its concave surface on the object side. At least one of the lens components of the third lens group is a cemented lens.

16 Claims, 9 Drawing Sheets

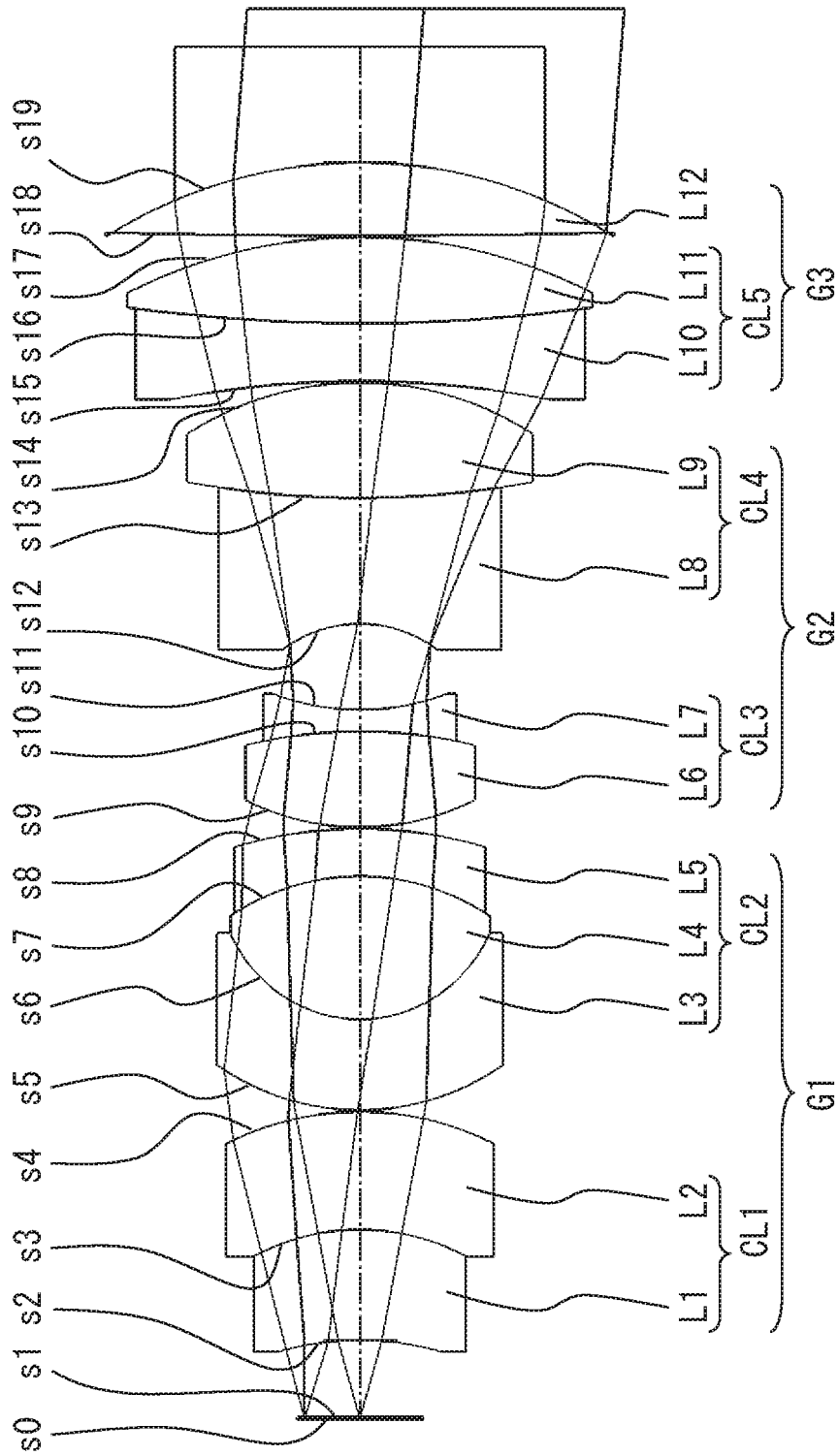
F I G. 1

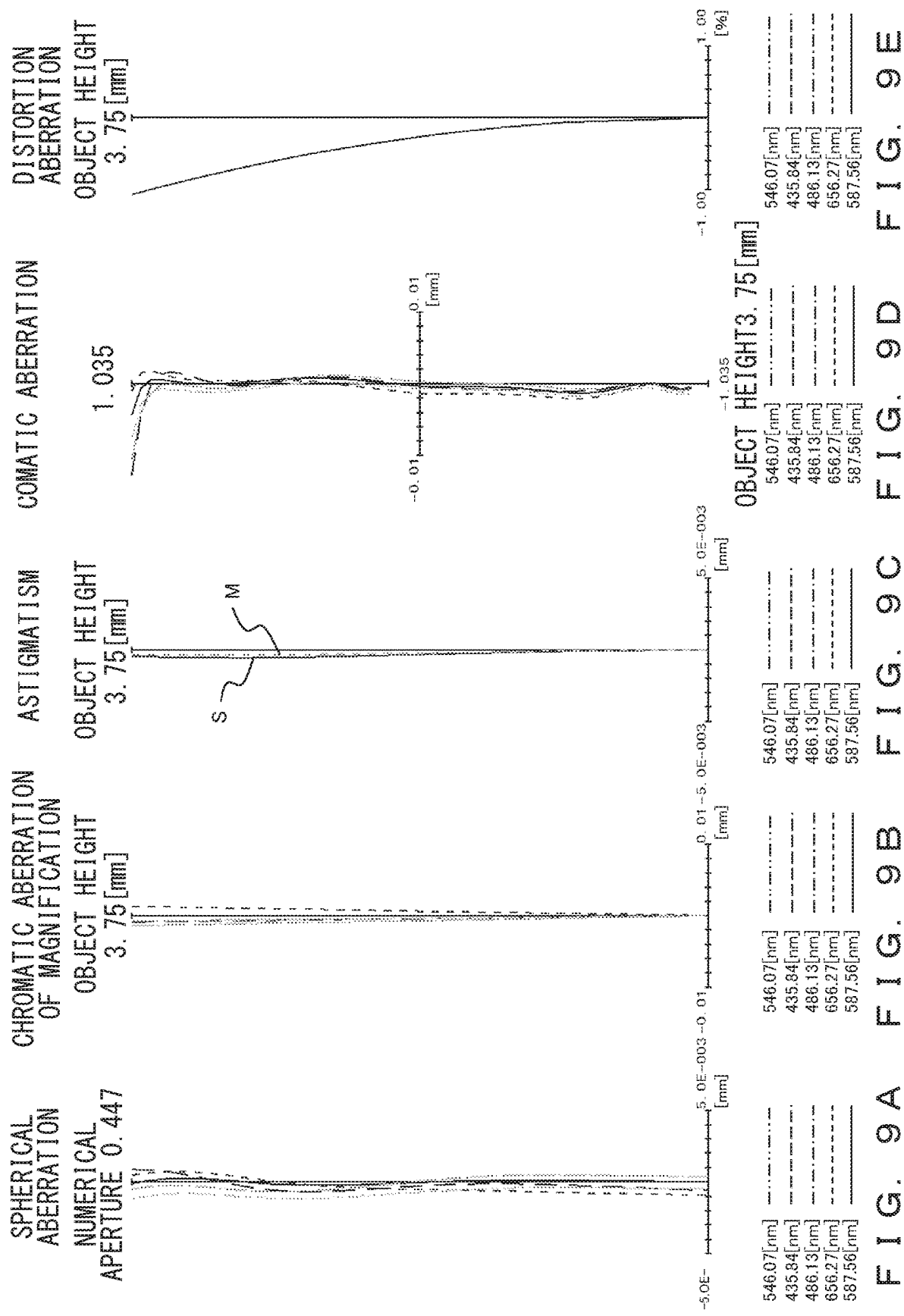

MICROSCOPE OBJECTIVE

CROSS REFERENCE TO RELATED APPLICATIONS

This application is based upon and claims the benefit of priority from prior Japanese Patent Application No. 2015-244628, filed Dec. 15, 2015, the entire contents of which are incorporated herein by this reference.

BACKGROUND OF THE INVENTION

Field of the Invention

The present invention is related to a microscope objective.

Description of the Related Art

In recent years, image pickup elements have been using significantly increasing numbers of pixels. In the field of microscopy, there is anticipation of a microscope apparatus capable of performing observation and image obtainment that permit both a wide field of view and a high resolution. For example, a microscope apparatus permitting a wide field of view and a high resolution applied to a virtual slide realizes a higher scanning speed. Also, when such a microscope apparatus is applied to fields such as brain research, more detailed observation of cells becomes possible while looking at the whole brain in real time.

In order to realize a microscope apparatus as described above, an objective having a wide field of view (i.e., a high field number and a low magnification) and a high numerical aperture is desired. Japanese Laid-open Patent Publication No. 2010-224477 and Japanese Laid-open Patent Publication No. 2010-014856 for example disclose such objectives.

SUMMARY OF THE INVENTION

An aspect of the present invention is a microscope objective including, in order starting from an object side, a first lens group, having a positive power, that includes a plurality of cemented lenses and that includes, closest to an object, a meniscus lens having a concave surface thereof on the object side; a second lens group, having a negative power, that includes a first meniscus lens component having a concave surface on an image side and a second meniscus lens component having a concave surface on the object side, the first and second meniscus lens components being two meniscus lens components having concave surfaces thereof facing each other; and a third lens group, having a positive power, that includes a plurality of lens components, at least one of which is a cemented lens.

BRIEF DESCRIPTION OF THE DRAWINGS

The present invention will be more apparent from the following detailed description when the accompanying drawings are referenced.

FIG. 1 is a sectional view of an objective 1 according to example 1 of the present invention;

FIG. 9A through FIG. 9E are aberration diagrams of the objective 4 shown in FIG. 8.

DESCRIPTION OF THE EMBODIMENTS

Figure 2:
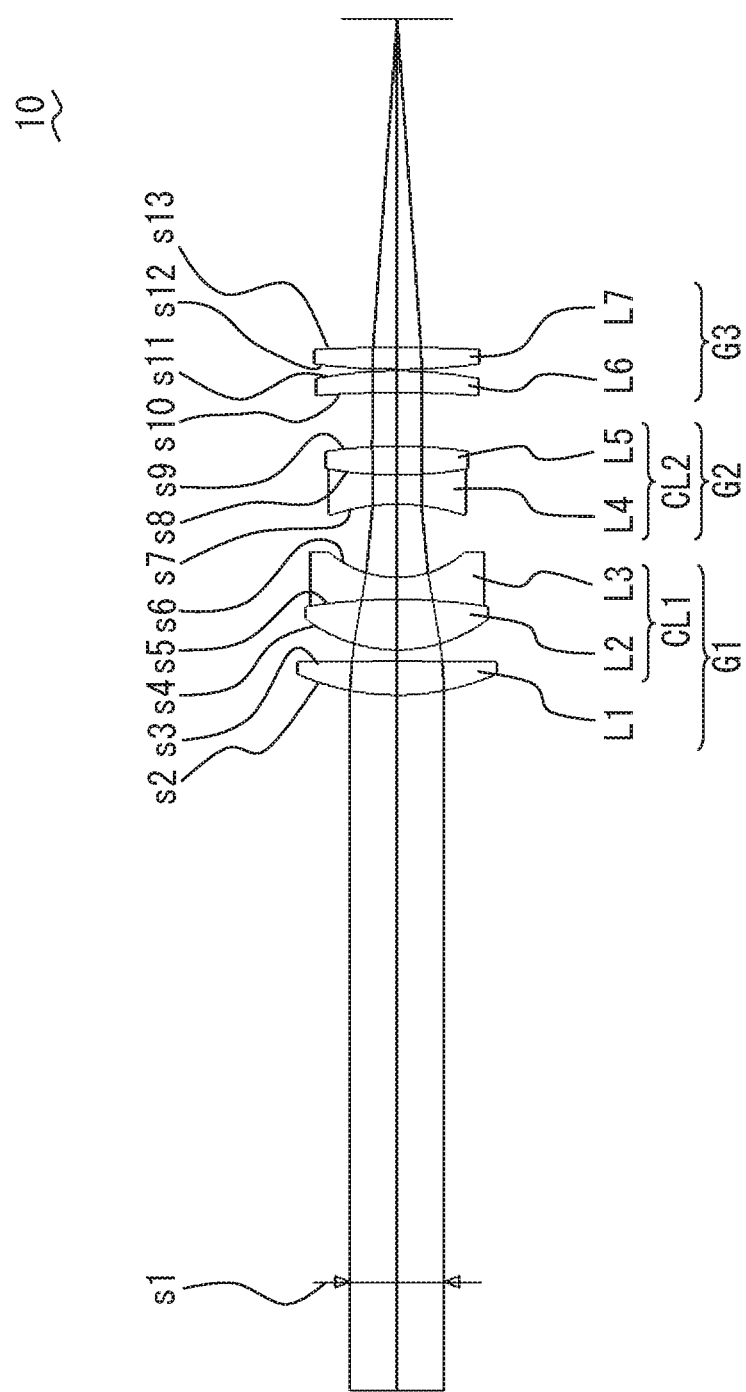
FIG. 2 is a sectional view of a tube lens 10 used in combination with the objective 1 shown in FIG. 1.

However, the objectives disclosed by Japanese Laid-open Patent Publication No. 2010-224477 and Japanese Laid-open Patent Publication No. 2010-014856 do not provide sufficient correction of the field curvature and comatic aberrations. This makes it difficult for microscope apparatuses with such objectives to realize high resolution at the periphery of the field of view. Also, the higher a numerical aperture is, the more the performance is deteriorated by off-axis aberrations. This makes it difficult to realize both a wide field of view and a high resolution.

Explanations will be given for an objective according to an embodiment of the present application. An objective according to the present embodiment is an infinity-corrected microscope objective, and meets the following conditional expressions below in order to realize a high numerical aperture with a wide field of view (i.e., a low magnification and a high field number).

$$0.2 \leq NA \leq 0.6 \quad (1)$$

$$2425 \leq FN/|\beta|/\varepsilon \quad (2)$$

In the above conditional expressions, NA is the numerical aperture of an object side of the objective. FN is a field number of an objective. β is a magnification of an objective. ε is an airy disc diameter on the axis with respect to a d ray of an objective. In this example, the magnification of an objective is equivalent to the projection magnification of a microscope optical system consisting of a combination between that objective and a tube lens with a focal length from 160 mm through 200 mm. Also, the field number of an objective is equivalent to twice the maximum image height of a microscope optical system consisting of a combination between the above tube lens and that objective. Note that when an image of a sample formed by this microscope optical system is observed digitally by using an image pickup element, the objective is compatible with an image pickup element with a diagonal length close to the field number at the maximum.

Conditional expression (1) represents conditions for obtaining a sufficient resolution. With NA being prevented from becoming smaller than the lower limit value of conditional expression (1), the airy disc diameter can be reduced sufficiently. This makes it possible to obtain a sufficient resolution. Also, with NA being prevented from exceeding the upper limit value of conditional expression (1), the divergence angle of the marginal ray entering the objective does not become too wide and thereby performance deterioration mainly caused by a comatic aberration can be suppressed. This makes it possible to obtain a sufficient resolution.

Conditional expression (2) represents conditions for obtaining a sufficient resolution and a wide field of view. With FN/|β|/ε being prevented from becoming smaller than the lower limit value of conditional expression (2), it is possible to perform sample observation and image obtainment with a wide field of view and high resolution by making the most of the performance of the image pickup element when an image pickup element with a high definition and a large size (i.e., with a large number of pixels) is used.

It is desirable that an objective according to the present embodiment meet conditional expressions (1-1) and (2-1) respectively instead of conditional expressions (1) and (2) above.

$$0.28 \leq NA \leq 50.45 \tag{1-1}$$

$$2425 \leq FN/|\beta|/\varepsilon \leq 10000 \tag{2-1}$$

Note that a tube lens used in combination with an objective of the present embodiment is a microscope tube lens that forms an enlarged image of an object (sample S) in combination with an objective. The tube lens has its aberration corrected effectively, and is configured to realize a high field number and a high numerical aperture.

Next, detailed explanations will be given for the structures and operations of an objective of the present embodiment. The objective includes, in order starting from the object side, a first lens group having a positive power (a positive refractive power); a second lens group, having a negative power (negative refractive power), that consist of two meniscus lens components with their concave surfaces facing each other; and a third lens group having a positive power. The first lens group uses the positive power so as to gradually converge the spreading (divergence) of the pencil of rays from the object. The second lens group uses the negative power so as to cause the state of the pencil of rays to spread, the pencil of rays having been converged by the first lens group. The third lens group uses the positive power so as to convert the pencil of rays into a parallel pencil of rays, the pencil of rays having been spread by the second lens group. Note that a pencil of rays (or a pencil of light) is a bundle of rays emitted from one point of an object (object point), and is also referred to as a light flux.

The first lens group includes a plurality of cemented lenses. The second lens group uses a strong negative power so as to spread rays. This results in a large on-axis chromatic aberration in the second lens group. The first lens group uses a plurality of cemented lenses so as to in-advance generate, in the opposite direction, an on-axis chromatic aberration corresponding to the on-axis chromatic aberration caused in the second lens group, and thereby corrects it. Also, the first lens group has a meniscus lens closest to the object, the meniscus lens having its concave surface on the object side. Having the concave surface closest to the object moderates the curve of the marginal ray in the first lens group and can suppress an occurrence of a spherical aberration. It is desirable that the first lens group have one or more cemented surfaces, on which positive and negative lenses are cemented, on the image side of the lens component that is closest to the object (referred to as a first lens component hereinafter).

The second lens group includes, in order starting from the object side, a first meniscus lens component having its concave surface on the image side and a second meniscus lens component having its concave surface on the object side. The second lens group uses the negative power so as to convert the pencil of rays into a spread pencil of rays, the pencil of rays having been converged by the first lens group. Thereby, the balance of the Petzval sum is achieved, and the spherical aberration is corrected together with the field curvature. It is desirable that the first meniscus lens component and the second meniscus lens component both have a negative power. This is because when one of them has a positive power, the negative power of the other becomes extremely strong in order to correct the field curvature effectively. In such a case, other aberrations, particularly a spherical aberration and an on-axis chromatic aberration, occur on a large scale, making it difficult to suppress the aberrations of the entire objective.

The third lens group includes a plurality of lens components, at least one of which is a cemented lens. It is desirable that the above one or more cemented lenses have a cemented surface on which positive and negative lenses are cemented. Because the entrance pupil position exists around the second lens group, when the off-axis principal ray passes through the first lens group, it travels on the other side, with respect to the optical axis, of the case that it passes through in the third lens group. This causes an off-axis aberration in the opposite direction from the off-axis aberration caused in the first lens group. Thereby, the off-axis aberration caused in the first lens group and the off-axis aberration caused in the third lens group operate in the directions in which they cancel each other. Also, the third lens group uses one or more cemented lenses so as to correct on-axis chromatic aberrations caused in the first and second lens groups. As described above, the third lens group has a function of mainly correcting an on-axis aberration and an off-axis aberration that failed to be corrected fully by the first and second lens groups.

Note that a "lens component" described herein refers to one lens block that includes at least one lens, regardless of whether it is a single lens or a cemented lens. The lens component has a plurality of lens surfaces. Of the plurality of lens surfaces, only two surfaces on the object side and the image side contact air (or immersion liquid).

Hereinafter, explanations will be given for conditions that are met by the objective of the present embodiment. The objective is configured to meet conditional expressions (3) through (5) below.

$$H_a \leq H_c \tag{3}$$

$$0.8 \leq F_3/F \leq 4.3 \tag{4}$$

$$1.5 \leq L_{ob}/L_{im} \leq 2.7 \tag{5}$$

In the conditional expressions, $H_a$ is the maximum ray height of the on-axis marginal ray in the first lens group. He is the ray height of the on-axis marginal ray at the time of being emitted from the third lens group. $F_3$ is the focal length of the third lens group. F is the focal length of the objective. $L_{ob}$ is the distance between the object plane and the concave surface of the first meniscus lens component facing the image side. $L_{im}$ is the distance between the concave surface of the second meniscus lens component facing the object side and the surface closest to the image in the third lens group (referred to as the final surface).

Conditional expression (3) represents a condition for efficiently suppressing various types of aberrations caused in the objective so that they are within a scope of a prescribed size. An $H_a$ that is greater than $H_c$ makes the ray height of the marginal ray too great in the first lens group. For this reason, the marginal ray height is decreased sharply in the first lens group, which causes a large aberration. This makes it difficult to effectively correct aberrations throughout the entire objective.

In order to effectively correct an off-axis aberration, it is necessary that the off-axis principal ray and the optical axis cross each other in the vicinity of the concave surfaces that face each other in the second lens group. Further, it is also necessary that the length of the entire lens group that is on the object side of the intersection and the length of the entire lens group that is on the image side be at an appropriate ratio. This is because rays pass through areas that are symmetric with respect to the optical axis between the object side and the image side, and rays traveling in directions symmetrical with respect to the optical axis in areas symmetrical with respect to the optical axis tend to have off-axis aberrations occurring in the opposite directions. Conditional expressions (4) and (5) represent conditions for correcting an off-axis aberration effectively.

Conditional expression (4) represents a condition for arranging the pupil position at an appropriate position so as to correct an off-axis aberration effectively. An $F_3/F$ that is smaller than the lower limit value of conditional expression (4) makes the focal length of the third lens group too short. This makes the pupil position too close to the image. This results in a ray height in a lens group on the image side that is smaller than that at the pupil position, making correction of an off-axis aberration difficult. Also, an $F_3/F$ that is greater than the upper limit value of conditional expression (4) makes the focal length of the third lens group too long. This makes the pupil position too close to the object. This results in too great a height of the off-axis principal ray in a lens group on the image side of the pupil position, causing an excessive comatic aberration. This leads to a situation in which the comatic aberration remains without being corrected appropriately throughout the entire objective.

Conditional expression (5) represents a condition for achieving an appropriate ratio of the lengths between the entire lens group on the object side of the pupil position and the other entire lens group on the image side of the pupil position so as to correct the off-axis aberration effectively. An $L_{ob}/L_{im}$ that is smaller than the lower limit value of conditional expression (5) results in too short a distance between the object plane and the concave surface of the first meniscus lens component. This prevents sufficient securement of an area where the height of the off-axis principal ray is great on the object side of the pupil position. This prevents an occurrence of a sufficient off-axis aberration in an area where the height of the off-axis principal ray on the object side of the pupil position is great, making it difficult to effectively correct the off-axis aberration throughout the entire objective. An $L_{ob}/L_{im}$ that is greater than the upper limit value of conditional expression (5) results in too long a distance between the object plane and the concave surface of the first meniscus lens component. This results in too large an occurrence amount of an off-axis aberration on the object side of the pupil position. This makes it difficult to effectively correct the off-axis aberration throughout the entire objective.

Hereinafter, explanations will be given for conditions that are desirably to be met by the objective of the present embodiment. It is desirable that the objective meet conditional expressions (6) through (18).

$$-0.55 \leq EXP_z/L \leq -0.15 \tag{6}$$

$$-1.2 \leq H_{ob}/H_s \leq -0.7 \tag{7}$$

$$-1.2 \leq F_2/F \leq -0.4 \tag{8}$$

$$0.4 \leq F_1/F \leq 0.61 \tag{9}$$

$$1.75 \leq F_{12}/F \leq 5.5 \tag{10}$$

$$-0.46 \leq (1/v_{3a} - 1/v_{3b}) \times 100 \leq 0.61 \tag{11}$$

$$-10.5 \leq (n_{3a} - n_{3b}) \times 100 \leq 15 \tag{12}$$

$$40 \leq \Sigma \Delta v \tag{13}$$

$$WD/L \leq 0.07 \tag{14}$$

$$0.47 \leq |R_{21}/R_{22}| \leq 0.65 \tag{15}$$

$$0.5 \leq R_{11}/R_{12} \leq 1 \tag{16}$$

$$0.7 \leq ER_1/F \leq 1.1 \tag{17}$$

$$0.3 \leq F_{21}/F_{22} \leq 5 \tag{18}$$

In the above conditional expressions, $EXP_z$ is a distance between the final surface and the pupil position of the objective and is a distance over which has a negative value when the pupil position is on the object side of the final surface. L is a distance between the object plane and the final surface. $H_{ob}$ is the ray height of the off-axis principal ray on the object plane. $H_s$ is the ray height of the off-axis principal ray on the final surface. $H_{ob}$ and $H_s$ are ray heights of the off-axis principal rays occurring at the same object point. Note that the height of a ray passing through one of the areas symmetric with respect to the optical axis (i.e., the two areas separated by the plane that includes the optical axis of the objective and that is parallel to the optical axis) is defined by a positive value and the ray height of a ray passing through the other area is defined by a negative value. $F_2$ is the focal length of the second lens group. $F_1$ is the focal length of the first lens group. $F_{12}$ is the synthetic focal length of the first and second lenses included in the first lens group counting from the object side. $v_{3a}$ is the Abbe number of a positive lens contacting the cemented surface of a cemented lens included in the third lens group. $v_{3b}$ is the Abbe number of a negative lens contacting the cemented surface of a cemented lens included in the third lens group. $n_{3a}$ is the refractive index with respect to a d ray of a positive lens contacting the cemented surface of a cemented lens included in the third lens group. $n_{3b}$ is a refractive index with respect to a d ray of a negative lens contacting the cemented surface of a cemented lens included in the third lens group. $\Delta v$ is an Abbe number difference of respective one or more cemented surfaces on which positive lenses and negative lenses included in the first lens group are cemented and which are included in the image side of the first lens component. An Abbe number difference of respective one or more cemented surfaces is an Abbe number difference of lenses located prior and subsequent to the one or more cemented surfaces, and is calculated by subtracting the Abbe number of a negative lens contacting the cemented surface from the Abbe number of a positive lens contacting the cemented surface. WD is the working distance of the objective. $R_{21}$ is the curvature radius of the concave surface, facing the image side, of the first meniscus lens component. $R_{22}$ is the curvature radius of the concave surface, facing the object side, of the second meniscus lens component. $R_{11}$ is the curvature radius of the surface closest to the object among the surfaces in the first lens component. $R_{12}$ is the curvature radius of the surface closest to the image among the surfaces in the first lens component. $ER_1$ is the outer diameter of the lens closest to the image. $F_{21}$ is the focal length of the first meniscus lens component. $F_{22}$ is the focal length of the second meniscus lens component.

Similarly to conditional expression (4), conditional expression (6) represents a condition for arranging the pupil position at an appropriate position so as to correct the off-axis aberration effectively. An $EXP_z/L$ that is smaller than the lower limit value of conditional expression (6) makes the pupil position too close to the object. This results in too great a height of the off-axis principal ray in a lens group on the image side of the pupil position. This makes it easy for an excessive comatic aberration to occur in a lens group on the image side of the pupil position. Also, an $EXP_s/L$ that is greater than the upper limit value of conditional expression (6) makes the pupil position too close to the image. This results in a low ray height in a lens group on the image side of the pupil position. This makes it difficult to correct an off-axis aberration in a lens group on the image side of the pupil position, which is not desirable.

Conditional expression (7) represents a condition for achieving an appropriate ratio between the height of the principal ray on the object plane and the height of the principal ray on the final surface so as to correct the off-axis aberration effectively. An $H_{ob}/H_s$ that is smaller than the lower limit value of conditional expression (7) makes the height of the off-axis principal ray too small on the final surface. This results in a small height of the off-axis principal ray when passing through the third lens group. This makes it difficult to correct the off-axis aberration in the third lens group sufficiently, which is not desirable. Also, an $H_{ob}/H_s$ that is greater than the upper limit value of conditional expression (7) makes too great the height of the off-axis principal ray on the final surface. This makes too great the height of the off-axis principal ray when passing through the third lens group. This makes it easy for an off-axis aberration to occur excessively in the third lens group, which is not desirable.

Conditional expression (8) represents a condition for making the Petzval sum an appropriate value so as to correct field curvature. An $F_2/F$ that is smaller than the lower limit value of conditional expression (8) results in too low a concave power (negative power) in the second lens group. This deteriorates the Petzval sum so that field curvature easily occurs. An $F_2/F$ that is greater than the upper limit value of conditional expression (8) results in too strong a power (negative power) in the second lens group. This makes it easy to occur field curvature in the opposite direction when the Petzval sum deteriorates and becomes smaller than the lower limit value. In order to make the Petzval sum an appropriate value so as to correct the field curvature without satisfying conditional expression (8), the first and third lens groups have to have a strong positive power. However, such a power distribution makes correction of other aberrations difficult, which is not desirable.

Conditional expression (9) represents a condition for making the focal length of the first lens group an appropriate length so as to suppress the occurrence amount of the spherical aberration mainly in the objective. An $F_1/F$ that is smaller than the lower limit value of conditional expression (9) results in a greater negative power of the second lens group as well in order to achieve a balance with the large positive power that the first lens group has. This results in a large refraction of the off-axis marginal ray in the second lens group and an increase in the occurrence amount of the spherical aberration in the second lens group. This makes it difficult to correct the spherical aberration throughout the entire objective. Also, an $F_1/F$ that is greater than the upper limit value of conditional expression (9) makes the positive power weaker in the first lens group. This increases the height of the marginal ray in the gauss group (second lens group). This makes it difficult to reduce the Petzval sum throughout the entire objective and also to correct the field curvature.

Conditional expression (10) represents a condition for making synthetic focal length $F_{12}$ of the first and second lenses, counting from the object side, be included in the first lens group appropriate so as to suppress the occurrence amount of the spherical aberration in the first lens group. An $F_{12}/F$ that is smaller than the lower limit value of the conditional expression (10) makes the positive power of the first and second lenses too strong. A sharp curve of the marginal ray in the first and second lenses causes a large spherical aberration in the first and second lenses. This makes it difficult to suppress the amount of the spherical aberration throughout the entire first lens group. Also, an $F_{12}/F$ that is greater than the upper limit value of conditional expression (10) makes the positive power of the first and second lenses too weak. In this situation, the first lens group distributes a large power to the surfaces of the lenses disposed on the image side of the second lens so as to cause a large refraction of the ray. In this case as well, it is difficult to suppress the amount of the spherical aberration throughout the entire first lens group.

Conditional expression (11) represents a condition mainly for correcting a chromatic aberration effectively. In the third lens group, the off-axis principal ray and the marginal ray both have a great ray height. While the third lens group can thereby contribute to efficient correction of aberrations both on and off the axis, too great an Abbe number difference on a cemented surface makes the amount of aberration that is occurring too large, which is not desirable. A $(1/v_{3a}-1/v_{3b}) \times 100$ that is smaller than the lower limit value of conditional expression (11) results in too large an occurrence amount of the on-axis chromatic aberration on a cemented surface. This makes it difficult to correct the on-axis chromatic aberration throughout the entire objective. Also, a $(1/v_{3a}-1/v_{3b}) \times 100$ that is greater than the upper limit value of the conditional expression (11) results in too small an occurrence amount of the chromatic aberration of magnification on a cemented surface. This makes it difficult to correct the chromatic aberration of magnification throughout the entire objective. Satisfying conditional expression (11) makes it possible to correct both a chromatic aberration of magnification and an on-axis chromatic aberration in a good balance.

When correction of a chromatic aberration of magnification is emphasized more than correction of an on-axis chromatic aberration, it is desirable that the objective further satisfy conditional expression (11-1) below. This is because when $v_{3a}$ is greater than $v_{3b}$, the chromatic aberration of magnification is corrected more, making it possible to correct the chromatic aberration of magnification at a higher level.

$$-0.46 \leq (1/v_{3a}-1/v_{3b}) \times 100 < 0 \quad (11\text{-}1)$$

When correction of an on-axis chromatic aberration is emphasized more than correction of a chromatic aberration of magnification, it is desirable that the objective satisfy conditional expression (11-2) below. This is because when $v_{3b}$ is equal to or greater than $v_{3a}$, the on-axis chromatic aberration can be corrected at a higher level by suppressing the occurrence amount of the on-axis chromatic aberration.

$$0 \leq (1/v_{3a}-1/v_{3b}) \times 100 \leq 0.61 \quad (11\text{-}2)$$

Conditional expression (12) represents a condition mainly for correcting a spherical aberration effectively. A $(n_{3a}-n_{3b}) \times 100$ that is smaller than the lower limit value of conditional expression (12) or that is greater than the upper limit value of conditional expression (12) results in too large an occurrence amount of a spherical aberration. This leads to a situation in which the spherical aberration is not corrected throughout the entire objective and a large on-axis chromatic aberration also occurs.

More desirably, the objective satisfies conditional expression (12-1) or (12-2) below. This is because the amount of a spherical aberration occurring in a cemented lens with the absolute value of $(n_{3a}-n_{3b}) \times 100$ being smaller than one is too small, making it difficult to perform sufficient correction on a spherical aberration that occurred in other lens groups.

$$-10.5 \leq (n_{3a}-n_{3b}) \times 100 \leq -1 \quad (12\text{-}1)$$

$$1 \leq (n_{3a}-n_{3b}) \times 100 \leq 15 \quad (12\text{-}2)$$

Conditional expression (13) represents a condition mainly for correcting an on-axis chromatic aberration effectively. A $40 \leq \Sigma$ that is smaller than the lower limit value of conditional expression (13) results in too large an occurrence amount of an on-axis chromatic aberration occurring in the first lens group. This makes it difficult to effectively correct the on-axis chromatic aberration occurring in the second lens group. Note that it is further desirable that the objective satisfy conditional expression (13-1) below because more effective correction of an on-axis chromatic aberration becomes possible.

$$80 \leq \Sigma \Delta v \quad (13\text{-}1)$$

Conditional expression (14) represents a condition for effectively correcting off-axis aberrations (comatic aberration and chromatic aberration of magnification) by adjusting the ratio between the length of the entire objective (distance between the object plane and the final surface) and the working distance. A WD/L that is greater than the upper limit value of conditional expression (14) with too long a working distance increases the ray height of the off-axis principal ray entering the objective, increasing the occurrence amount of the off-axis aberration. Also, A WD/L that is smaller than the lower limit value of conditional expression (14) with too short a working distance also decreases the length of the entire first lens group. This makes it difficult to sufficiently arrange lens surfaces for correcting a chromatic aberration of magnification to the first lens group.

Conditional expression (15) represents a condition for suppressing the occurrence amount of the spherical aberration in the second lens group. When conditional expression (15) is not satisfied, a power is concentrated on either the concave surface facing the image side in the first meniscus lens component or the concave surface facing the object side in the second meniscus lens component. This prevents rays from being curved moderately in the second lens group, making it difficult to suppress the occurrence amount of the spherical aberration in the second lens group. An $|R_{21}/R_{22}|$ that is smaller than the lower limit value of conditional expression (15) results in too small a curvature radius of the concave surface facing the image side in the first meniscus lens component. This causes a large spherical aberration in the first meniscus lens component. Also, an $|R_{21}/R_{22}|$ that is greater than the upper limit value of conditional expression (15) results in too small a curvature radius of the concave surface facing the object side in the second meniscus lens component. This causes a large spherical aberration in the second meniscus lens component.

Conditional expression (16) represents a condition for effectively correcting a comatic aberration by causing an appropriate amount of a comatic aberration in the first lens group. The smaller $R_{11}$ becomes, the greater the angle of the off-axis principal ray after passing through that lens surface becomes due to the refraction in the lens surface so as to act in the direction of increasing the ray height. By contrast, the smaller $R_{12}$ is, the more the angle of the off-axis principal ray is suppressed. This has an effect of decreasing the ray height. An $R_{11}/R_{12}$ that is smaller than the lower limit value of conditional expression (16) makes $R_{11}$ too small for $R_{12}$. This results in too great a height of the off-axis principal ray when being emitted from the first lens component. This results in too large an occurrence amount of the comatic aberration in the lenses in the first lens group on the image side of the first lens component. This makes it difficult to correct the comatic aberration throughout the entire objective. An $R_{11}/R_{12}$ that is greater than the upper limit value of conditional expression (16) makes $R_{11}$ too great for $R_{12}$. This results in too small an occurrence amount of the off-axis aberration in a different lens of the first lens group on the image side of the first lens component. This makes it difficult to correct off-axis aberrations occurring in and subsequent to the second lens group.

Conditional expression (17) represents a condition for controlling the reduction in the peripheral brightness while securing the productivity of the objective. An $ER_1/F$ that is smaller than the lower limit value of conditional expression (17) increases the deterioration in NA of the off-axis pencil of rays in the third lens group. Thereby, an insufficient amount of brightness in an area with a great image height causes an unevenness in the brightness on the image plane. Also, an $ER_1/F$ that is greater than the upper limit value of conditional expression (17) results in too large an outer diameter of a lens included in the third lens group, leading to a larger useless lens area, through which the pencil of rays does not pass. A larger lens makes it difficult to process lenses and frames, decreasing the processing accuracy. Thus, unnecessarily large lenses are not desirable.

Conditional expression (18) represents a condition mainly for suppressing the occurrence amount of the spherical aberration in the second lens group so as to correct the spherical aberration effectively. When conditional expression (18) is not satisfied, a negative power is concentrated on either the first meniscus lens component or the second meniscus lens. An $F_{21}/F_{22}$ that is smaller than the lower limit value of conditional expression (18) results in too great a negative power in the first meniscus lens component. This sharply refracts the marginal ray in the first meniscus lens component. This causes a large spherical aberration in the first meniscus lens component, making it difficult to correct the spherical aberration throughout the entire objective. Also, an $F_{21}/F_{22}$ that is greater than the upper limit value of conditional expression (18) results in too great a negative power in the second meniscus lens component. This sharply refracts the marginal ray in the second meniscus lens component. This causes a large spherical aberration in the second meniscus lens component, making it difficult to correct the spherical aberration throughout the entire objective.

The objective according to the present embodiment can realize excellent aberration performance while achieving a wide field of view and a high numerical aperture. Hereinbelow, specific explanations will be given for examples of the above described objective.

Example 1

FIG. 1 is a sectional view of an objective 1 according to the present example. The objective 1 exemplified in FIG. 1 is a microscope objective, and includes, in order starting from the object side, first lens group G1 having a positive power, second lens group G2 having a negative power, and third lens group G3 having a positive power.

First lens group G1 includes a plurality of cemented lenses (cemented lenses CL1 and CL2) and includes, closest to the object, a meniscus lens having its concave surface on the object side. In more detail, first lens group G1 includes, in order starting from the object side, cemented lens CL1 (a first lens component), which is a two-piece cemented lens, and cemented lens CL2, which is a three-piece cemented lens. Cemented lens CL1 includes a meniscus lens (lens L1) having its concave surface on the object side and a meniscus lens (lens L2) having its concave surface on the object side. Cemented lens CL2 includes a meniscus lens (lens L3) having its concave surface on the image side, biconvex lens (lens L4), and a meniscus lens (lens L5) having its concave surface on the object side.

Second lens group G2 includes a first meniscus lens component (cemented lens CL3) having its concave surface on the image side and a second meniscus lens component (cemented lens CL4) having its concave surface on the object side, the first and second meniscus lens components being two meniscus lens components having their concave surfaces facing each other. The first meniscus lens component is a two-piece cemented lens having a negative power, and includes a biconvex lens (lens L6) and a biconcave lens (lens L7). The second meniscus lens component is a two-piece cemented lens having a negative power, and includes a biconcave lens (lens L8) and a biconvex lens (lens L9).

Third lens group G3 includes two lens components (cemented lens CL5 and lens L12), one of which is a cemented lens (cemented lens CL5). Cemented lens CL5 includes a biconcave lens (lens L10) and a biconvex lens (lens L11). Also, the other lens component is a meniscus lens (lens L12) having its concave surface on the object side.

The objective 1 has data as below.
NA=0.28, FN=30 mm, ε=0.002562 mm, β=4, L=81.80 mm, WD=5 mm, F=45 mm, $F_1$=18.83 mm, $F_2$=−18.58 mm, $F_3$=43.12 mm, $F_{12}$=93.9401 mm, $F_{21}$=−84.0484 mm, $F_{22}$=−21.4337 mm, $L_{ob}$=46.18 mm, $L_{im}$=30.02 mm, $EXP_z$=−37.89192 mm, $H_a$=5.17 mm, $H_c$=12.61 mm, $H_{ob}$=−3.75 mm, $H_s$=3.475 mm, $v_{3a}$=81.54, $v_{3b}$=70.23, $n_{3a}$=1.497, $n_{3b}$=1.48749, $R_{11}$=−20.3849 mm, $R_{12}$=−20.8816 mm, $R_{21}$=17.1025 mm, $R_{22}$=−9.0597 mm, $ER_1$=33.53 mm The objective 1 has the following lens data, with INF representing infinity (∞).

| Objective 1 | | | | |
|---|---|---|---|---|
| s | r | d | nd | vd |
| s0 (object plane) | INF | 0.17 | 1.521 | 56.02 |
| s1 | INF | 5 | | |
| s2 | −20.3849 | 7.1907 | 1.755 | 52.32 |
| s3 | −15.769 | 7.6698 | 1.6779 | 55.34 |
| s4 | −20.8816 | 0.1 | | |
| s5 | 17.5309 | 5.9111 | 1.48749 | 70.23 |
| s6 | 9.7269 | 9.3094 | 1.497 | 81.54 |
| s7 | −16.3222 | 3.0956 | 1.755 | 52.32 |
| s8 | −31.0716 | 0.1 | | |
| s9 | 18.1966 | 6.2309 | 1.43875 | 94.93 |
| s10 | −34.7339 | 1.4027 | 1.61336 | 44.49 |
| s11 | 17.1025 | 5.6013 | | |
| s12 | −9.0597 | 8.1854 | 1.6968 | 55.53 |
| s13 | 67.166 | 7.5166 | 1.43875 | 94.93 |
| s14 | −22.236 | 0.1 | | |
| s15 | −69.1104 | 3.7458 | 1.48749 | 70.23 |
| s16 | 121.6762 | 5.6212 | 1.497 | 81.54 |
| s17 | −36.1714 | 0.1 | | |
| s18 | 813.6555 | 4.7504 | 1.497 | 81.54 |
| s19 | −33.3084 | | | |

In the above, s represents a surface number, r represents a curvature radius (mm), d represents a distance between surfaces (mm), nd represents a refractive index with respect to a d ray, and vd represents an Abbe number. These symbols have similar meanings also in the other examples. The surfaces represented by surface numbers s0 and s1 respectively represent the object plane (the surface of the cover glass on the object side) and the surface of the cover glass on the image side, while the surfaces represented by surface numbers s2 and s19 respectively represent the lens surface of the objective closest to the object and the lens surface of the objective closest to the image. Also, for example, distance d0 between the surfaces represents a distance between the surface represented by surface number s0 and the surface represented by surface number s1.

The objective 1 satisfies the above conditional expressions (conditional expressions (1) through (18)) as will be described later. Note that field number FN and magnification β are values in a case when they are combined with a tube lens 10 shown in FIG. 2. This point applies also to the other examples. Note that the configuration of the tube lens 10 exemplified in FIG. 2 will be described later.

$$NA=0.28 \tag{1}$$

$$FN/|\beta|/\varepsilon=2927.40 \tag{2}$$

$$H_a/H_c=0.40999207<1 \tag{3}$$

$$F_3/F=0.96 \tag{4}$$

$$L_{ob}/L_{im}=1.54 \tag{5}$$

$$EXP_z/L=-0.46 \tag{6}$$

$$H_{ob}/H_s=-1.08 \tag{7}$$

$$F_2/F=-0.41 \tag{8}$$

$$F_1/F=0.42 \tag{9}$$

$$F_{12}/F=2.08 \tag{10}$$

$$(1/v_{3a}-1/v_{3b})\times100=-0.1975 \tag{11}$$

$$(n_{3a}-n_{3b})\times100=0.9510 \tag{12}$$

$$\Sigma\Delta v=40.53 \tag{13}$$

$$WD/L=0.06 \tag{14}$$

$$|R_{21}/R_{22}|=0.53 \tag{15}$$

$$R_{11}/R_{12}=0.98 \tag{16}$$

$$ER_1/F=0.75 \tag{17}$$

$$F_{21}/F_{22}=3.92 \tag{18}$$

Figure 3:
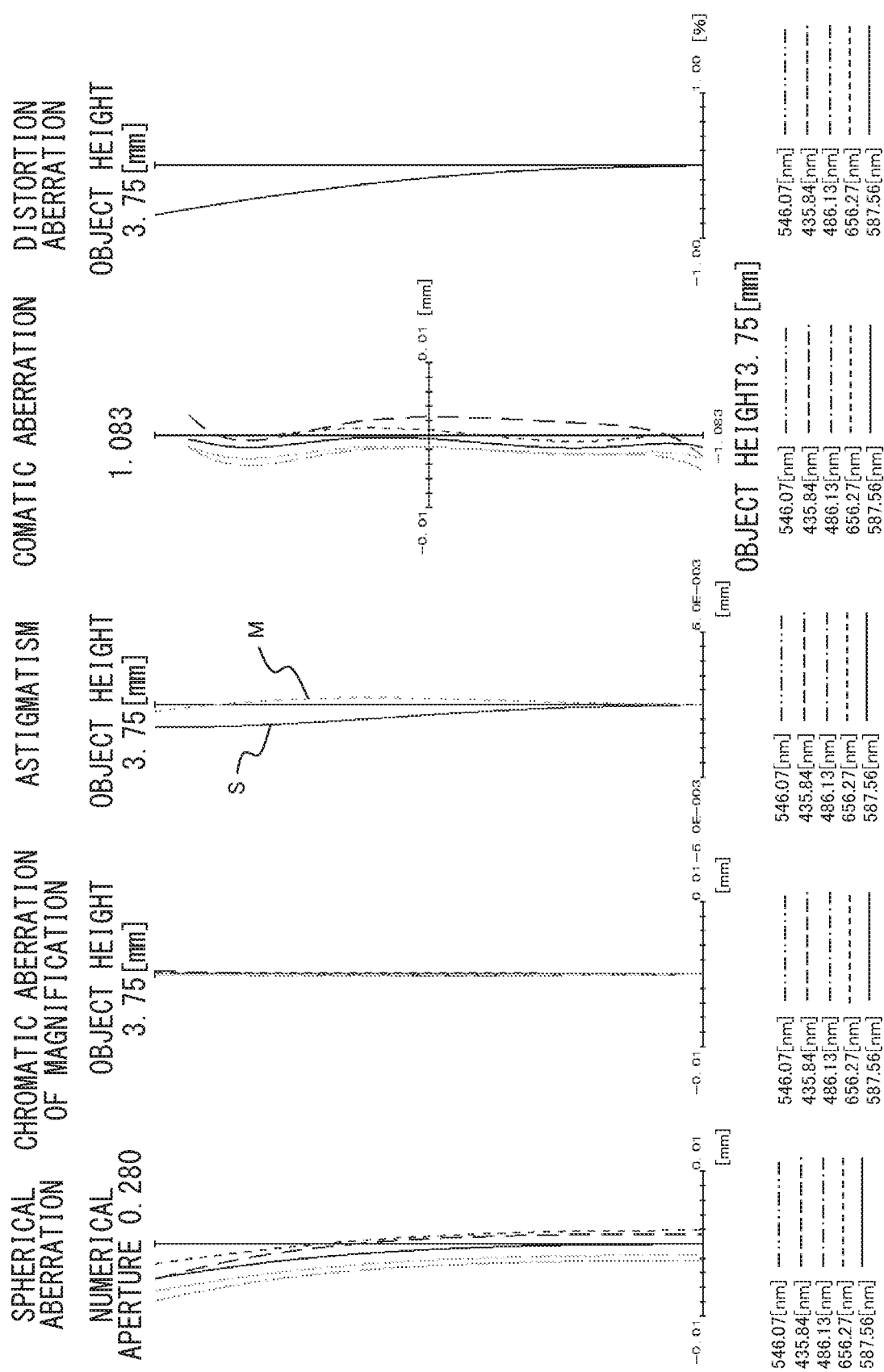
FIG. 3A through FIG. 3E are aberration diagrams of the objective 1 shown in FIG. 1.

FIG. 3A through FIG. 3E are aberration diagrams of the objective 1 shown in FIG. 1, and are aberration diagrams on the object plane in a case when reverse ray tracing is conducted in which the infinity light flux having entered from the image side is traced toward the object side. FIG. 3A is a spherical aberration diagram. FIG. 3B is a diagram of a chromatic aberration of magnification. FIG. 3C is an astigmatism diagram. FIG. 3D is a comatic aberration diagram. FIG. 3E is a distortion aberration diagram. In the diagrams, "M" and "S" represent a meridional component and a sagittal component, respectively.

Example 2

Figure 4:
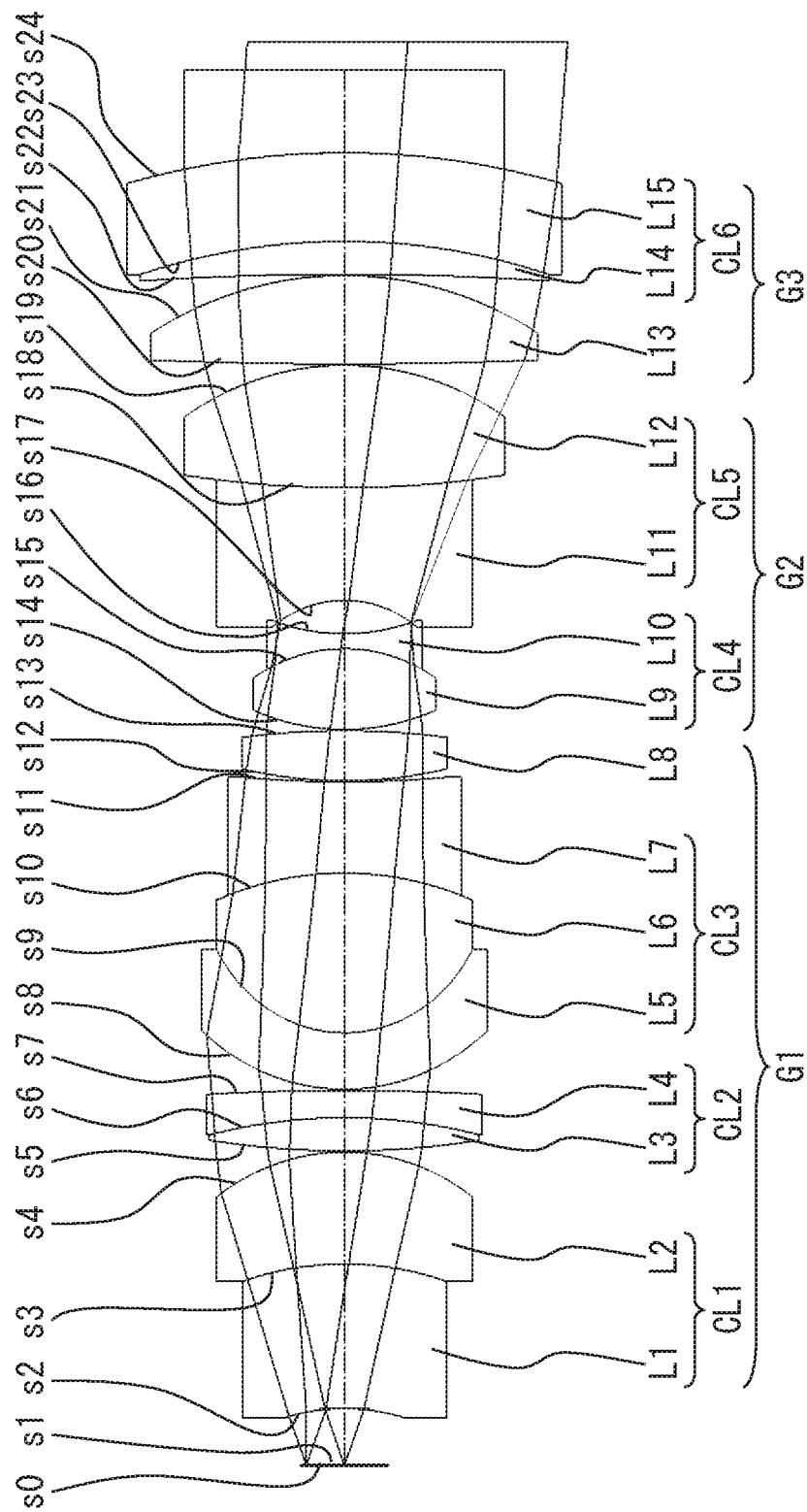
FIG. 4 is a sectional view of an objective 2 of example 2 of the present invention.

FIG. 4 is a sectional view of an objective 2 of the present example. The objective 2 exemplified in FIG. 4 is a microscope objective, and includes, in order starting from the object side, first lens group G1 having a positive power, second lens group G2 having a negative power, and third lens group G3 having a positive power.

First lens group G1 includes a plurality of cemented lenses (cemented lenses CL1 through CL3) and includes, closest to the object, a meniscus lens (lens L1) having its concave surface on the object side. In more detail, first lens group G1 includes, in order starting from the object side, cemented lens CL1 (a first lens component), which is a two-piece cemented lens, cemented lens CL2, which is a two-piece cemented lens, cemented lens CL3, which is a three-piece cemented lens, and a biconvex lens (lens L8). Cemented lens CL1 includes a meniscus lens (lens L1) having its concave surface on the object side and a meniscus lens (lens L2) having its concave surface on the object side. Cemented lens CL2 includes a biconvex lens (lens L3) and a meniscus lens (lens L4) having its concave surface on the object side. Cemented lens CL3 is a meniscus lens (lens L5) having its concave surface on the image side, a biconvex lens (lens L6) and a biconvex lens (lens L7).

Second lens group G2 includes a first meniscus lens component (cemented lens CL4) having its concave surface on the image side and a second meniscus lens component (cemented lens CL5) having its concave surface on the object side, the first and second meniscus lens components being two meniscus lens components having their concave surfaces facing each other. The first meniscus lens component is a two-piece cemented lens having a negative power, and includes a biconvex lens (lens L9) and a biconcave lens (lens L10). The second meniscus lens component is a two-piece cemented lens having a negative power, and includes a biconcave lens (lens L11) and a biconvex lens (lens L12).

Third lens group G3 includes two lens components (lens L13 and cemented lens CL6), one of which is a cemented lens (cemented lens CL6). Cemented lens CL6 includes a meniscus lens having its concave surface on the object side (lens L14) and a meniscus lens having its concave surface on the object side (lens L15). Also, the other lens component is a biconvex lens (lens L13).

The objective 2 has data as below.
NA=0.35, FN=30 mm, ε=0.0020496 mm, β=4, L=118.32 mm, WD=5 mm, F=45 mm, $F_1$=21.1215 mm, $F_2$=−23.52 mm, $F_3$=57.194 mm, $F_{12}$=80.6647 mm, $F_{21}$=−60.54 mm, $F_{22}$=−32.24 mm, $L_{ob}$=74.99 mm, $L_{im}$=40.34 mm, $EXP_z$=−60.53028 mm, $H_a$=8.45 mm, $H_c$=15.76 mm, $H_{ob}$=−3.75 mm, $H_s$=5.40177 mm, $v_{3a}$=39.68, $v_{3b}$=52.32, $n_{3a}$=1.65412, $n_{3b}$=1.755, $R_{11}$=−21.3341 mm, $R_{12}$=−21.6693 mm, $R_{21}$=21.6635 mm, $R_{22}$=−11.8433 mm, $ER_1$=41.56 mm The objective 2 has the following lens data, with INF representing infinity (∞).

| Objective 2 | | | | |
|---|---|---|---|---|
| s | r | d | nd | vd |
| s0(object plane) | INF | 0.17 | 1.521 | 56.02 |
| s1 | INF | 5 | | |
| s2 | −21.3341 | 13.0344 | 1.755 | 52.32 |
| s3 | −32.8824 | 10.0857 | 1.6516 | 58.55 |
| s4 | −21.6693 | 0.1 | | |
| s5 | 93.3157 | 3 | 1.43875 | 94.93 |
| s6 | −57.0645 | 2.4849 | 1.6968 | 55.53 |
| s7 | −259.4907 | 0.1 | | |
| s8 | 21.6715 | 5.1924 | 1.52249 | 59.84 |
| s9 | 14.4057 | 14.5453 | 1.497 | 81.54 |
| s10 | −33.6197 | 8.4043 | 1.6968 | 55.53 |
| s11 | 118.9664 | 0.1 | | |
| s12 | 46.8362 | 4.8199 | 1.43875 | 94.93 |
| s13 | −82.8972 | 0.1 | | |
| s14 | 23.9625 | 7.2911 | 1.43875 | 94.93 |
| s15 | −16.9256 | 1.3618 | 1.61336 | 44.49 |
| s16 | 21.6635 | 2.9996 | | |
| s17 | −11.8433 | 10.1457 | 1.6516 | 58.55 |
| s18 | 112.9107 | 11.0349 | 1.43875 | 94.93 |
| s19 | −29.2068 | 0.1 | | |
| s20 | 473.887 | 7.9831 | 1.43875 | 94.93 |
| s21 | −37.523 | 0.1 | | |
| s22 | −344.2673 | 2.9851 | 1.65412 | 39.68 |
| s23 | −66.2821 | 7.965 | 1.755 | 52.32 |
| s24 | −84.8721 | | | |

The objective 2 satisfies the above conditional expressions as will be described later.

Figure 5:
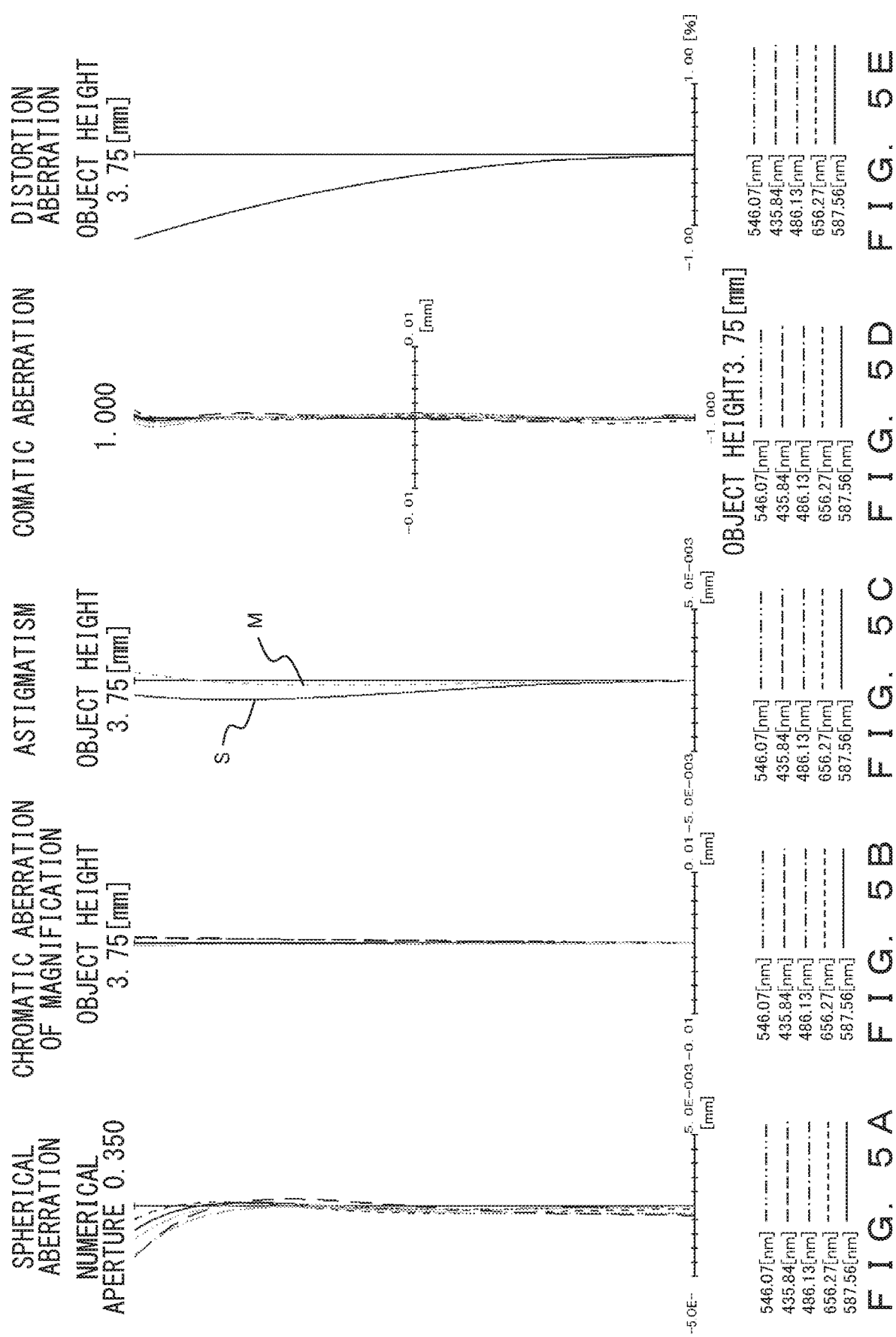
FIG. 5A through FIG. 5E are aberration diagrams of the objective 2 shown in FIG. 4.

$NA=0.35$ (1):

$FN/|\beta|/\varepsilon=3959.25$ (2):

$H_a/H_c=0.536167513<1$ (3):

$F_3/F=1.27$ (4):

$L_{ob}/L_{im}=1.86$ (5):

$EXP_z/L=-0.51$ (6):

$H_{ob}/H_s=-0.69$ (7):

$F_2/F=-0.52$ (8):

$F_1/F=0.47$ (9):

$F_{12}/F=1.79$ (10):

$(1/v_{3a}-1/v_{3b})\times 100=0.6088$ (11):

$(n_{3a}-n_{3b})\times 100=-10.09$ (12):

$\Sigma\Delta v=47.71$ (13):

$WD/L=0.04$ (14):

$|R_{21}/R_{22}|=0.54$ (15):

$R_{11}/R_{12}=0.99$ (16):

$ER_1/F=0.92$ (17):

$F_{21}/F_{22}=1.88$ (18):

FIG. 5A through FIG. 5E are aberration diagrams of the objective 2 shown in FIG. 4, and are aberration diagrams on the object plane in a case when reverse ray tracing is conducted in which the infinity light flux having entered from the image side is traced toward the object side. FIG. 5A is a spherical aberration diagram. FIG. 5B is a diagram of a chromatic aberration of magnification. FIG. 5C is an astigmatism diagram. FIG. 5D is a comatic aberration diagram. FIG. 5E is a distortion aberration diagram. In the diagrams, "M" and "S" represent a meridional component and a sagittal component, respectively.

Example 3

Figure 6:
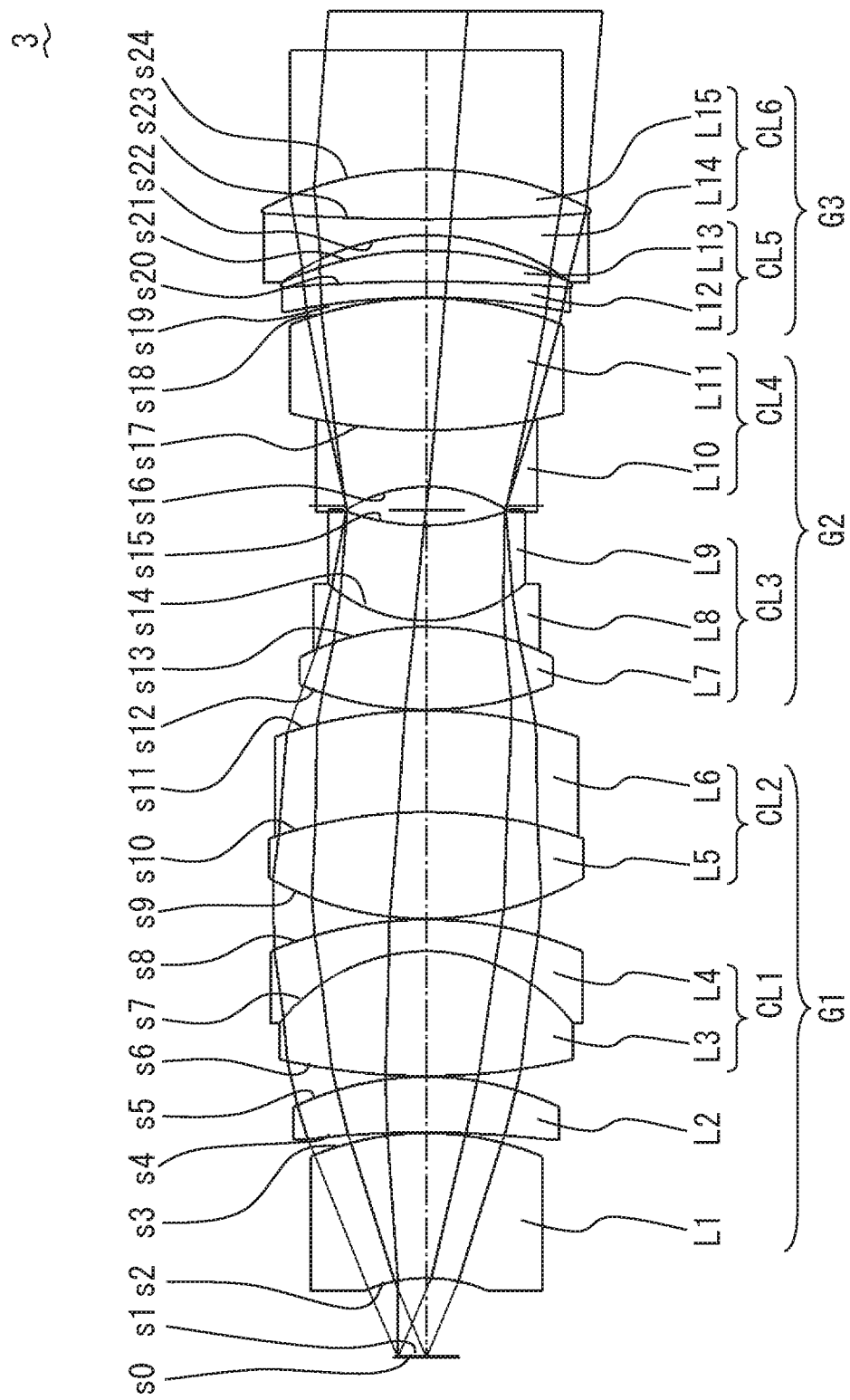
FIG. 6 is a sectional view of an objective 3 of example 3 of the present invention.

FIG. 6 is a sectional view of an objective 3 of the present example. The objective 3 exemplified in FIG. 6 is a microscope objective, and includes, in order starting from the object side, first lens group G1 having a positive power, second lens group G2 having a negative power and third lens group G3 having a positive power.

First lens group G1 includes a plurality of cemented lenses (cemented lenses CL1 and CL2) and includes, closest to the object, a meniscus lens (lens L1) having its concave surface on the object side. In more detail, first lens group G1 includes, in order starting from the object side, a meniscus lens (lens L1, a first lens component) having its concave surface on the object side, a meniscus lens (lens L2) having its concave surface on the object side, cemented lens CL1, which is a two-piece cemented lens, and cemented lens CL2, which is a two-piece cemented lens. Cemented lens CL1 includes a biconvex lens (lens L3) and a meniscus lens (lens L4) having its concave surface on the object side. Cemented lens CL2 includes a biconvex lens (lens L5) and a meniscus lens (lens L6) having its concave surface on the object side.

Second lens group G2 includes a first meniscus lens component (cemented lens CL3) having its concave surface on the image side and a second meniscus lens component (cemented lens CL4) having its concave surface on the object side, the first and second meniscus lens components being two meniscus lens components having their concave surfaces facing each other. The first meniscus lens component is a three-piece cemented lens having a negative power, and includes a biconvex lens (lens L7), a biconcave lens (lens L8), and a meniscus lens (lens L9) having its concave surface on the image side. The second meniscus lens component is a two-piece cemented lens having a negative power, and includes a biconcave lens (lens L10) and a biconvex lens (lens L11).

Third lens group G3 includes two lens components (cemented lens CL5 and lens CL6), both of which are cemented lenses. Cemented lens CL5 includes a meniscus lens (lens L12) having its concave surface on the object side and another meniscus lens (lens L13) having its concave surface on the object side. Cemented lens CL6 includes a biconcave lens (lens L14) and a biconvex lens (lens L15).

The objective 3 has data as below, where $v_{3a}$ represents the Abbe number of lens L15, $v_{3b}$ represents the Abbe number of lens L14, $n_{3a}$ represents the refractive index of lens L15 and $n_{3b}$ represents the refractive index of lens L14.

NA=0.4, FN=30 mm, ε=0.0017934 mm, β=4, L=150 mm, WD=9.9046 mm, F=45 mm, $F_1$=26.95 mm, $F_2$=-43.3513 mm, $F_3$=157.9059 mm, $F_{12}$=214.4439 mm, $F_{21}$=-57.76 mm, $F_{22}$=-139.94 mm, $L_{ob}$=105.0782 mm, $L_{im}$=40.0333 mm, $EXP_z$=-43.9822 mm, $H_a$=15.15 mm, $H_c$=18 mm, $H_{ob}$=-3.75 mm, $H_s$=3.73759 mm, $v_{3a}$=52.32, $v_{3b}$=420.41, $n_{3a}$=1.75504, $n_{3b}$=1.63779, $R_{11}$=-21.4448 mm, $R_{12}$=-41.033 mm, $R_{21}$=32.3362 mm, $R_{22}$=-20.7265 mm, $ER_1$=42.39 mm

The objective 3 has the following lens data, with INF representing infinity (∞).

| Objective 3 | | | | |
|---|---|---|---|---|
| s | r | d | nd | vd |
| s0(object plane) | INF | 0.187 | 1.52103 | 56.02 |
| s1 | INF | 9.9046 | | |
| s2 | −21.4448 | 18.2948 | 1.75504 | 52.32 |
| s3 | −41.033 | 0.1 | | |
| s4 | −144.2477 | 7 | 1.60303 | 65.44 |
| s5 | −42.3993 | 0.1 | | |
| s6 | 90.581 | 15.7484 | 1.43876 | 94.93 |
| s7 | −25.3911 | 4 | 1.51635 | 64.14 |
| s8 | −55.2747 | 0.1 | | |
| s9 | 44.818 | 13.4741 | 1.43876 | 94.93 |
| s10 | −66.4218 | 12.8018 | 1.63779 | 42.41 |
| s11 | −62.1359 | 0.1 | | |
| s12 | 46.0232 | 10.4675 | 1.43876 | 94.93 |
| s13 | −38.5172 | 0.8 | 1.63779 | 42.41 |
| s14 | 20.616 | 12 | 1.43876 | 94.93 |
| s15 | 32.3362 | 4.8884 | | |
| s16 | −20.7265 | 7.1061 | 1.61344 | 44.27 |
| s17 | 77.2046 | 16.6885 | 1.73806 | 32.26 |
| s18 | −49.9894 | 0.1 | | |
| s19 | −94.7933 | 2 | 1.63779 | 42.41 |
| s20 | −228.7538 | 3.9049 | 1.75504 | 52.32 |
| s21 | −47.6049 | 1.9344 | | |
| s22 | −33.833 | 2 | 1.63779 | 42.41 |
| s23 | 294.7101 | 6.2995 | 1.75504 | 52.32 |
| s24 | −50.0023 | | | |

The objective 3 satisfies the above conditional expressions as will be described later.

$$NA=0.4 \quad (1):$$

$$FN/|\beta|/\varepsilon=4182.001 \quad (2):$$

$$H_a/H_c=0.536167513<1 \quad (3):$$

$$F_3/F=3.51 \quad (4):$$

$$L_{ob}/L_{im}=2.62 \quad (5):$$

$$EXP_z/L=-0.29 \quad (6):$$

$$H_{ob}/H_s=-1.00 \quad (7):$$

$$F_2/F=-0.96 \quad (8):$$

$$F_1/F=0.60 \quad (9):$$

$$F_{12}/F=4.77 \quad (10):$$

$$(1/v_{3a}-1/v_{3b})\lambda 100=-0.4466 \quad (11):$$

$$(n_{3a}-n_{3b})\times 100=11.72 \quad (12):$$

$$\Sigma\Delta v=83.31 \quad (13):$$

$$WD/L=0.07 \quad (14):$$

$$|R_{21}/R_{22}|=0.64 \quad (15):$$

$$R_{11}/R_{12}=0\ 0.51 \quad (16):$$

$$ER_1/F=0.94 \quad (17):$$

$$F_{21}/F_{22}=0.41 \quad (18):$$

Figure 7:
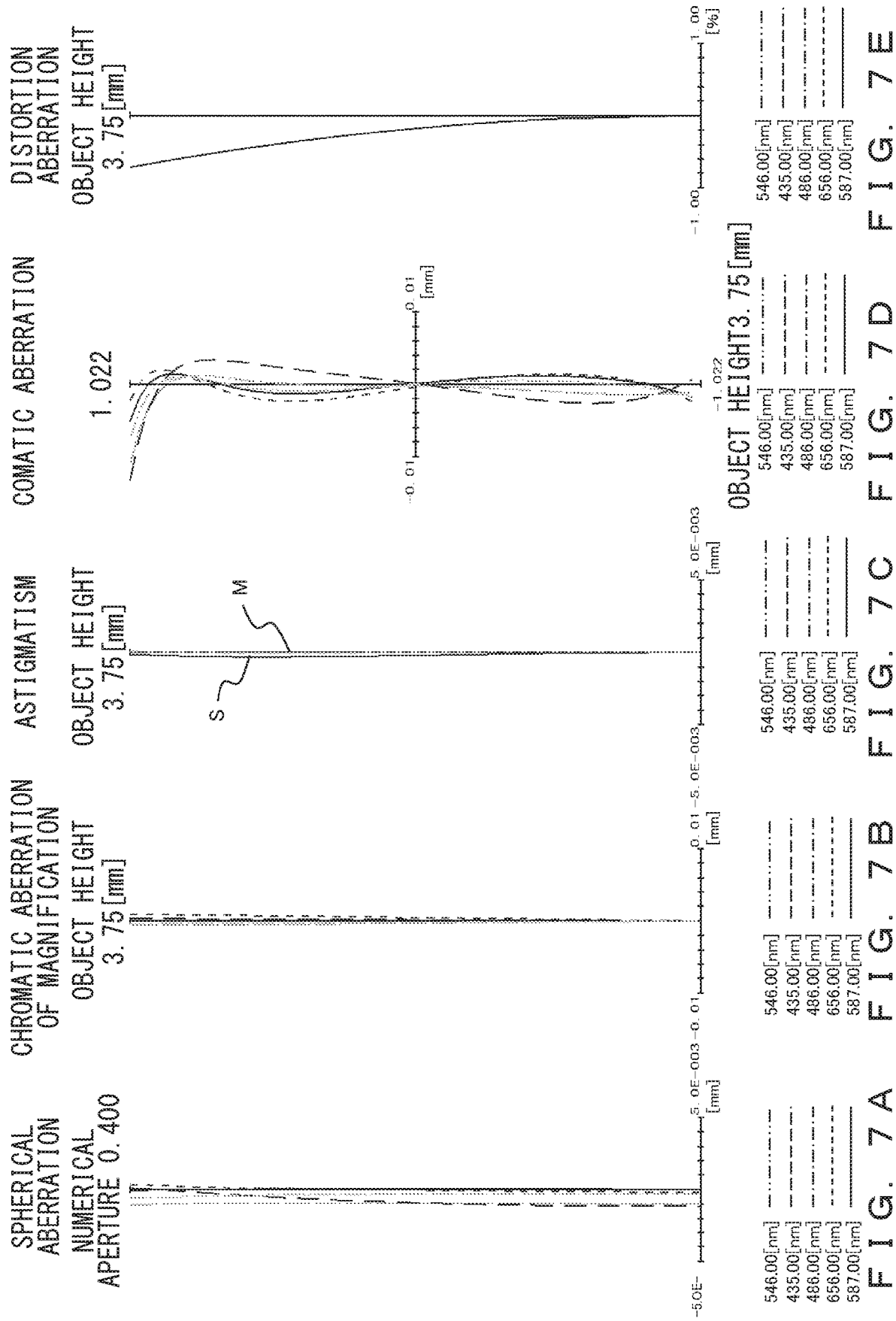
FIG. 7A through FIG. 7E are aberration diagrams of the objective 3 shown in FIG. 6.

FIG. 7A through FIG. 7E are aberration diagrams of the objective 3 shown in FIG. 6, and are aberration diagrams on the object plane in a case when reverse ray tracing is conducted in which the infinity light flux having entered from the image side is traced toward the object side. FIG. 7A is a spherical aberration diagram. FIG. 7B is a diagram of a chromatic aberration of magnification. FIG. 7C is an astigmatism diagram. FIG. 7D is a comatic aberration diagram. FIG. 7E is a distortion aberration diagram. In the diagrams, "M" and "S" represent a meridional component and a sagittal component, respectively.

Example 4

Figure 8:
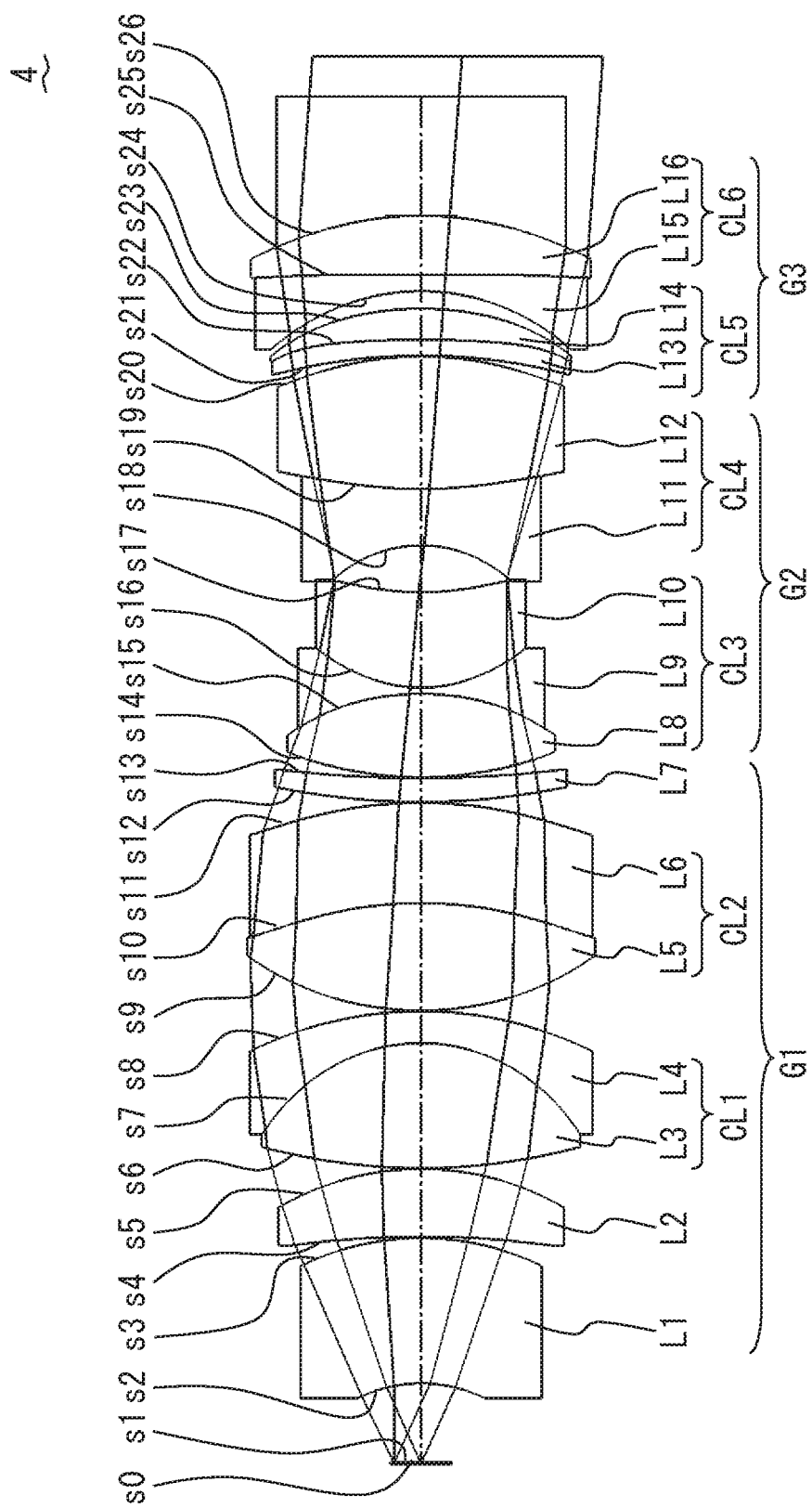
FIG. 8 is a sectional view of an objective 4 of example 4 of the present invention.

FIG. 8 is a sectional view of an objective 4 according to the present example. The objective 4 exemplified in FIG. 8 is a microscope objective, and includes, in order starting from the object side, first lens group G1 having a positive power, second lens group G2 having a negative power, and third lens group G3 having a positive power.

First lens group G1 includes a plurality of cemented lenses (cemented lenses CL1 and CL2) and includes, closest to the object, a meniscus lens (lens L1) having its concave surface on the object side. In more detail, first lens group G1 includes, in order starting from the object side, a meniscus lens (lens L1, a first lens component) having its concave surface on the object side, a meniscus lens (lens L2) having its concave surface on the object side, cemented lens CL1, which is a two-piece cemented lens, cemented lens CL2, which is a two-piece cemented lens, and a meniscus lens (lens L7) having its concave surface on the image side. Cemented lens CL1 includes a biconvex lens (lens L3) and a meniscus lens (lens L4) having its concave surface on the object side. Cemented lens CL2 includes a biconvex lens (lens L5) and a meniscus lens (lens L6) having its concave surface on the object side.

Second lens group G2 includes a first meniscus lens component (cemented lens CL3) having its concave surface on the image side and a second meniscus lens component (cemented lens CL4) having its concave surface on the object side, the first and second meniscus lens components being two meniscus lens components having their concave surfaces facing each other. The first meniscus lens component is a three-piece cemented lens having a negative power, and includes a biconvex lens (lens L8), a biconcave lens (lens L9), and a meniscus lens (lens L10) having its concave surface on the image side. The second meniscus lens component is a two-piece cemented lens having a negative power, and includes a biconcave lens (lens L11) and a biconvex lens (lens L12).

Third lens group G3 includes two lens components (cemented lens CL5 and cemented lens CL6), both of which are a cemented lens. Cemented lens CL5 includes a meniscus lens (lens L13) having its concave surface on the object side and a meniscus lens (lens L14) having its concave surface on the object side. Cemented lens CL6 includes a meniscus lens (lens L15) having its concave surface on the object side and a meniscus lens (lens L16) having its concave surface on the object side.

The objective 4 has data as below, where $v_{3a}$ represents the Abbe number of lens L14, $v_{3b}$ represents the Abbe number of lens L13, $n_{3a}$ represents the refractive index of lens L14 and $n_{3b}$ represents the refractive index of lens L13. NA=0.447, FN=30 mm, ε=0.001594133 mm, β=4, L=157.06 mm, WD=9.9639 mm, F=45 mm, $F_1$=27.334 mm, $F_2$=−50.61 mm, $F_3$=188.82 mm, $F_{12}$=247.2113 mm, $F_{21}$=−68.61 mm, $F_{22}$=−127.96 mm, $L_{ob}$=109.66 mm, $L_{im}$=41.50 mm, $EXP_z$=−46.86025 mm, $H_a$=17.89 mm, $H_c$=20.15 mm, $H_{ob}$=−3.75 mm, $H_s$=3.99519 mm, $v_{3a}$=52.32, $v_{3b}$=420.41, $n_{3a}$=1.755, $n_{3b}$=1.63775, $R_{11}$=−21.5806 mm, $R_{12}$=−41.8101 mm, $R_{21}$=34.9095 mm, $R_{22}$=−20.9235 mm, $ER_1$=46 mm The objective 4 has the following lens data, with INF representing infinity and * marks beside numbers representing that the surfaces corresponding to the numbers are aspheric surfaces. In other words, lenses L5, L6 and L8 through L16 are aspheric lenses.

| Objective 4 | | | | |
|---|---|---|---|---|
| s | r | d | nd | vd |
| s0(object plane) | INF | 0.187 | 1.521 | 56.02 |
| s1 | INF | 9.9639 | | |
| s2 | −21.5806 | 18.2936 | 1.755 | 52.32 |
| s3 | −41.8101 | 0.197 | | |
| s4 | −142.6628 | 8.4967 | 1.603 | 65.44 |
| s5 | −43.4265 | 0.0894 | | |
| s6 | 93.5451 | 15.7458 | 1.43875 | 94.93 |
| s7 | −27.1634 | 4.0005 | 1.51633 | 64.14 |
| s8 | −59.1127 | 0.1008 | | |
| s9* | 48.478 | 13.4849 | 1.43875 | 94.93 |
| s10* | −66.353 | 12.6339 | 1.63775 | 42.41 |
| s11* | −69.8412 | 0.1 | | |
| s12 | 109.0841 | 2.9997 | 1.56907 | 71.3 |
| s13 | 183.6256 | 0.101 | | |
| s14* | 50.8559 | 10.4669 | 1.43875 | 94.93 |
| s15* | −42.4335 | 0.7991 | 1.63775 | 42.41 |
| s16* | 20.8627 | 12 | 1.43875 | 94.93 |
| s17* | 34.9095 | 5.8959 | | |
| s18* | −20.9235 | 7.1064 | 1.6134 | 44.27 |
| s19* | 68.4783 | 16.6889 | 1.738 | 32.26 |
| s20* | −50.085 | 0.1005 | | |
| s21 | −88.921 | 2 | 1.63775 | 42.41 |
| s22* | −162.6834 | 3.9053 | 1.755 | 52.32 |
| s23* | −48.1385 | 2.1994 | | |
| s24 | −33.5432 | 2 | 1.63775 | 42.41 |
| s25* | −493.9817 | 7.5002 | 1.755 | 52.32 |
| s26* | −50.2931 | | | |

The objective 4 has aspheric surface data as follows. The aspheric shape is expressed by the following equation. Z represents the coordinate in the optical axis direction on an aspheric surface. Y represents the coordinate in the directions orthogonal to the optical axis on the aspheric surface and K represents a conic constant. r represents a paraxial curvature radius on the aspheric surface. AC2, AC4, AC6 and AC8 are second-order, fourth-order, sixth-order and eighth-order aspheric coefficients, respectively. E represents the exponent of ten.

$$Z = \frac{Y^2}{r + r\sqrt{1-(K+1)(Y/r)^2}} + AC2Y^2 + AC4Y^4 + AC6Y^6 + AC8Y^8$$

The Ninth Surface s9
K=−0.0506, AC2=−1.75E-04, AC4=1.89E-06, AC6=−1.34E-09, AC8=9.61E-13
Tenth Surface s10
K=0, AC2=1.63E-05, AC4=−4.14E-06, AC6=1.09E-08, AC8=−4.64E-12
Eleventh Surface s11
K=0, AC2=−9.69E-06, AC4=−2.86E-06, AC6=8.58E-09, AC8=−4.88E-12
Fourteenth Surface s14
K=−5.0258, AC2=−2.19E-04, AC4=−2.10E-06, AC6=4.72E-09, AC8=1.99E-11
Fifteenth Surface s15
K=0, AC2=4.79E-05, AC4=−1.16E-05, AC6=1.07E-08, AC8=5.18E-12
Sixteenth Surface s16
K=−0.1551, AC2=−6.51E-04, AC4=−1.65E-05, AC6=−1.13E-08, AC8=9.11E-11

Seventeenth Surface s17
K=0.0264, AC2=−2.72E-03, AC4=−1.18E-05, AC6=−1.23E-08, AC8=8.88E-13
Eighteenth Surface s18
K=−0.4196, AC2=−1.11E-03, AC4=−1.31E-05, AC6=−6.70E-09, AC8=−4.32E-12
Nineteenth Surface s19
K=−5, AC2=3.58E-05, AC4=−6.60E-06, AC6=1.13E-08, AC8=−7.11E-12
Twentieth Surface s20
K=−5, AC2=−6.18E-06, AC4=−4.04E-06, AC6=5.43E-09, AC8=−2.03E-13
Twenty-Second Surface s22
K=−0.6998, AC2=−1.25E-04, AC4=2.04E-06, AC6=−2.37E-08, AC8=4.91E-12
Twenty-Third Surface s23
K=−2.9705, AC2=−2.37E-05, AC4=−7.78E-06, AC6=−2.31E-09, AC8=−2.07E-12
Twenty-Fifth Surface s25
K=0, AC2=−1.95E-06, AC4=−6.93E-06, AC6=1.00E-08, AC8=−5.19E-12
Twenty-Sixth Surface s26
K=−2.9985, AC2=4.21E-06, AC4=−1.33E-06, AC6=6.72E-10, AC8=−8.44E-13

The objective 4 satisfies the above conditional expressions as will be described below.

$NA=0.447$ (1):

$FN/|\beta|/\varepsilon=4704.75$ (2):

$H_d/H_c=0.887841191<1$ (3):

$F_3/F=4.20$ (4):

$L_{ob}/L_{im}=2.64$ (5):

$EXP_z/L=-0.30$ (6):

$H_{ob}/H_s=-0.94$ (7):

$F_2/F=-1.12$ (8):

$F_1/F=0.61$ (9):

$F_{12}/F=5.49$ (10):

$(1/\nu_{3a}-1/\nu_{3b})\times100=-0.4466$ (11):

$(n_{3a}-n_{3b})\times100=11.72$ (12):

$\Sigma\Delta\nu=83.31$ (13):

$WD/L=0.06$ (14):

$|R_{21}/R_{22}|=0.60$ (15):

$R_{11}/R_{12}=0.51$ (16):

$ER_1/F=1.02$ (17):

$F_{21}/F_{22}=0.54$ (18):

FIG. 9A through FIG. 9E are aberration diagrams of the objective 4 shown in FIG. 8, and are aberration diagrams on the object plane in a case when reverse ray tracing is conducted in which the infinity light flux having entered from the image side is traced toward the object side. FIG. 9A is a spherical aberration diagram. FIG. 9B is a diagram of a chromatic aberration of magnification. FIG. 9C is an astigmatism diagram. FIG. 9D is a comatic aberration diagram. FIG. 9E is a distortion aberration diagram. In the diagrams, "M" and "S" represent a meridional component and a sagittal component, respectively.

Lastly, explanations will be given for the tube lens 10 exemplified in FIG. 2, which is used in common in examples 1 through 4. The tube lens 10 is a microscope tube lens that forms an enlarged image of an object by being combined with an infinity-corrected objective. The tube lens 10 includes, in order starting from the object side, first lens group G1, having a positive power, that includes cemented lens CL1, second lens group G2 having a negative power, and third lens group G3, having a positive power as its total power, that includes a plurality of lenses (L6 and L7), each of which has a positive power.

First lens group G1 of the tube lens 10 includes, in order starting from the object side, biconvex lens L1 and a cemented lens CL1 including biconvex lens L2 and a biconcave lens L3. Second lens group G2 includes, in order starting from the object side, cemented lens CL2 including biconcave lens L4 and biconvex lens L5. Third lens group G3 includes, in order starting from the object side, positive meniscus lens L6 having its concave surface on the object side and biconvex lens L7.

The tube lens 10 has the following lens data, with INF representing infinity (∞).

| Tube lens 10 | | | | |
|---|---|---|---|---|
| s | r | d | nd | νd |
| s1 | INF | 162.2 | | |
| s2 | 63.8523 | 9.3326 | 1.497 | 81.54 |
| s3 | −1485.8995 | 3.1666 | | |
| s4 | 39.1423 | 13.9864 | 1.497 | 81.54 |
| s5 | −145.3496 | 6 | 1.51633 | 64.14 |
| s6 | 26.8639 | 20.2953 | | |
| s7 | −53.5928 | 8.0905 | 1.72047 | 34.71 |
| s8 | 110.3106 | 7.877 | 1.43875 | 94.93 |
| s9 | −130 | 14.8023 | | |
| s10 | −288.1082 | 6 | 1.59522 | 67.74 |
| s11 | −114.1428 | 0.4703 | | |
| s12 | 176.2945 | 6 | 1.85026 | 32.27 |
| s13 | −475.1754 | | | |

What is claimed is:

1. A microscope objective comprising, in order starting from an object side:
   a first lens group, having a positive power, that includes a plurality of cemented lenses and that arranges, at a position closest to an object along an optical axis of the microscope objective, a meniscus lens having a concave surface thereof on the object side, each lens included in the first lens group having a fixed position along the optical axis;
   a second lens group, having a negative power, that includes a first meniscus lens component having a concave surface on an image side and a second meniscus lens component having a concave surface on the object side, the first and second meniscus lens components being two meniscus lens components having concave surfaces thereof facing each other; and
   a third lens group, having a positive power, that includes a plurality of lens components, at least one of which is a cemented lens,
   wherein:
   each of the first and second meniscus lens components is a lens block that includes at least one lens and that has a plurality of lens surfaces, and only two of the plurality of lens surfaces on the object side and the image side of each of the first and second meniscus lens components contact air, and the microscope objective satisfies $$-1.2 \leq H_{ob}/H_s \leq -0.7 \quad (7)$$

where $H_{ob}$ represents a ray height of an off-axis principal ray on an object plane, and $H_s$ represents a ray height of the off-axis principal ray on a final surface, which is closest to an image, of the third lens group, and a ray height of a ray passing through one of two areas separated by a plane parallel to an optical axis of the microscope objective including the optical axis is defined by a positive value and a ray height of a ray passing through the other one of the two areas is defined by a negative value.

2. The microscope objective according to claim 1, satisfying $$Ha \leq Hc \quad (3)$$

where Ha represents a maximum ray height of an on-axis marginal ray in the first lens group and Hc represents a ray height of the on-axis marginal ray when being emitted from the third lens group.

3. The microscope objective according to claim 2, satisfying $$0.8 \leq F3/F \leq 4.3 \quad (4)$$

where F3 represents a focal length of the third lens group and F represents a focal length of the microscope objective.

4. The microscope objective according to claim 3, satisfying $$1.5 \leq Lob/\mathrm{Lim} \leq 2.7 \quad (5)$$

where Lob represents a distance between the object plane and the concave surface of the first meniscus lens component facing the image side and Lim represents a distance between the concave surface of the second meniscus lens component facing the object side and the final surface, which is closest to the image, of the third lens group.

5. The microscope objective according to claim 4, satisfying $$-0.55 \leq EXP_z/L \leq -0.15 \quad (6)$$

where $EXP_z$ represents a distance between the final surface, which is closest to the image, of the third lens group and a pupil position of the microscope objective, the distance being a distance having a negative value with the pupil position on the object side of the final surface, and L represents a distance between the object plane and the final surface.

6. The microscope objective according to claim 1, satisfying $$-1.2 \leq F_2/F \leq -0.4 \quad (8)$$

where $F_2$ represents a focal length of the second lens group.

7. The microscope objective according to claim 6, satisfying $$0.4 \leq F_1/F \leq 0.61 \quad (9)$$

where $F_1$ represents a focal length of the first lens group.

8. The microscope objective according to claim 7, satisfying $$1.75 \leq F_{12}/F \leq 5.5 \quad (10)$$

where $F_{12}$ represents synthetic focal lengths of first and second lenses, in order starting from the object side, included in the first lens group.

9. The microscope objective according to claim 8, wherein a cemented lens included in the third lens group includes a cemented surface on which a positive lens and a negative lens are cemented, and the microscope objective satisfies $$-0.46 \leq (1/\nu_{3a} - 1/\nu_{3b}) \times 100 \leq 0.61 \quad (11)$$

where $\nu_{3a}$ represents an Abbe number of the positive lens contacting the cemented surface and $\nu_{3b}$ represents an Abbe number of the negative lens contacting the cemented surface.

10. The microscope objective according to claim 9, wherein the microscope objective satisfies $$-10.5 \leq (n_{3a} - n_{3b}) \times 100 \leq 15 \quad (12)$$

where $n_{3a}$ represents a refractive index with respect to a d ray of the positive lens contacting the cemented surface and $n_{ab}$ represents a refractive index with respect to a d ray of the negative lens constituting the cemented surface.

11. The microscope objective according to claim 10, wherein the first lens group includes, on the image side of a first lens component, which is a lens component closest to the object included in the first lens group, one or more cemented surfaces on which a positive lens and a negative lens are cemented, and the microscope objective satisfies $$40 \leq \Sigma \Delta \nu \quad (13)$$

where $\Delta \nu$ represents an Abbe number difference of lenses located prior and subsequent to the respective one or more cemented surfaces, the Abbe number difference being a result of subtracting an Abbe number of the negative lens contacting the cemented surface from an Abbe number of the positive lens contacting the cemented surface, and $\Sigma \Delta \nu$ represents a sum of Abbe number differences of the one or more cemented surfaces.

12. The microscope objective according to claim 11, satisfying $$WD/L \leq 0.07 \quad (14)$$

where WD represents a working distance of the microscope objective and L represents a distance between the object plane and the final surface, which is closest to the image, of the third lens group.

13. The microscope objective according to claim 12, satisfying $$0.47 \leq |R_{21}/R_{22}| \leq 0.65 \quad (15)$$

where $R_{21}$ represents a curvature radius of the concave surface of the first meniscus lens component facing the image side and $R_{22}$ represents a curvature radius of the concave surface of the second meniscus lens component facing the object side.

14. The microscope objective according to claim 13, satisfying $$0.5 \leq R_{11}/R_{12} \leq 1 \quad (16)$$

where $R_{11}$ represents a curvature radius of a surface closest to the object among surfaces of a first lens component, which is a lens component, closest to the object, included in the first lens group and $R_{12}$ represents a curvature radius of a surface closest to the image among the surfaces of the first lens component.

15. The microscope objective according to claim 1, wherein the first meniscus lens component has a negative power, and the second meniscus lens component has a negative power.

16. The microscope objective according to claim 1, wherein the plurality of cemented lenses included in the first lens group are directly adjacent to each other along the optical axis.

* * * * *